Patented July 19, 1932

1,868,447

UNITED STATES PATENT OFFICE

SOLOMON CAPLAN, OF BROOKLYN, NEW YORK, ASSIGNOR TO COMBUSTION UTILITIES CORPORATION, OF NEW YORK, N. Y., A CORPORATION OF MAINE

PURIFICATION OF TAR-ACID-BEARING OILS

No Drawing. Application filed September 25, 1928. Serial No. 308,342.

The present invention relates to the purification of tar-acid-bearing oils, and more particularly to a process for eliminating color producing compounds from tar-acid-bearing oils containing them.

This is a continuation in part of my co-pending application Ser. No. 740,625 filed September 29, 1924.

Some tar-acid-bearing oils, (such as low-temperature tars, blast-furnace tars, vertical retort tars, shale oils and other liquid condensates resulting from the distillation of bituminous material under carbonizing conditions mild enough to preserve the liquid by-products in a substantially primary and undecomposed form), contain certain impurities which render them unsatisfactory or make them undesirable for certain uses. One form in which these impurities manifest themselves is in the production of colored compounds when such oils are used for the manufacture of disinfectants, animal dips, saponified cresol or tar acid solutions and related products. After an exhaustive and thorough investigation of the chemical composition and products of these colored compounds their origin has been traced to certain strongly reducing polyhydroxy compounds of which catechol, or 1-2 dihydroxy benzene may be cited as similar in constitution.

The primary object of the present invention is to provide a process for removing color producing compounds from tar-acid-bearing oils containing them.

Heretofore in preparing and refining tar-acid-bearing oils of the class described for use in the manufacture of disinfectants, animal dips and similar products, the oils have been treated to fractionation, to washings with sulfuric acid, to treatment with sulfur dioxide or to distillation over lime or caustic soda to remove color-producing impurities and to prevent color formation. All of these methods for purifying the oil by removal of color-producing impurities or prevention of color formation have not been entirely satisfactory, either because they are expensive or else because the high boiling residue eliminated from the oil by the treatment contains a large proportion of high boiling monohydroxy tar acids in addition to the polyhydroxy compounds, and as these high boiling monohydroxy tar acids are the most valuable germicides present in the oils their elimination greatly reduces the disinfectant value of the product. Another objection to most of the methods in use at present is that a redistillation of the oil is required which is costly and wasteful.

Another object of the present invention is to provide a process by which the color-producing bodies present in such tar-acid-bearing oils can be cheaply and completely extracted without also removing the valuable tar acids.

The substances producing the pink color in disinfectant emulsions prepared from such tar-acid-bearing oils are closely related to catechol and other dihydroxy phenols, and while they are hydroxy derivatives they are more acidic, more soluble in water, and more readily oxidized than are the monohydroxy tar acids. Attempts were made to employ caustic soda and other strong alkalies for removing these more acid components from the oils but this treatment has proven unsatisfactory. The caustic alkalies even in weak solution act as catalyzers for oxidation reactions wherein the color-producing compounds react with oxygen from the air to yield pink to red oxidation products. The more alkaline the solution the more pronounced are these reactions. The pink and red reaction products are less acidic than the original color-producing bodies and accordingly dissolve less readily in the alkali. As a result, the selective action of the caustic on these compounds is far from sharp, a great number of washings are required, and a considerable percentage of valuable tar acids are sacrificed before the balance of the oil is completely freed of the color-producing compounds. All caustic alkalies are stable and highly ionized in solution, and when they are used as extraction agents it is impossible to maintain weakly alkaline concentrations such as are necessary for the selective removal of the polyhydroxy compounds without loss of monohydroxy tar acids, because the caustic alkali is incapable of renewing the supply of hydroxyl ions as it is exhausted.

Accordingly another object of the present invention is to provide a process for selectively separating color-producing bodies from tar-acid-bearing oils without substantial loss of monohydroxy tar acids and without harmful secondary reactions.

In addition to the color-forming materials, these tar-acid-bearing oils contain as impurities various ammonium salts and in particular ammonium chloride, whose presence is deleterious in the direct precipitation from the oils of aldehyde condensation products. Accordingly still another object of this invention is the removal from the oils of ammonium salts and other impurities which interfere with the formation and precipitation of condensation products.

With these and other objects in view the invention consists in the process for purifying tar-acid-containing oils hereinafter described and particularly defined in the claims.

The process forming the subject of the present invention is based on the fact that the color-producing compounds and deleterious ammonium salts present in tar-acid-bearing oils of the class described are more soluble in water at room temperatures than are the valuable mono-hydroxy tar-acids. Essentially therefore, the present process consists in extracting the oil with several times its volume of water either at room temperature or at a temperature only slightly above room temperature.

When water is used as a preferential solvent for selectively removing the impurities described, it has been found that the best results are obtained if about five volumes of water are agitated for thirty minutes at room temperature with one volume of the oil. A second similar extraction is sometimes necessary to remove final traces of the poly-hydroxy-compounds, but a third extraction is rarely required. It has been found that heating to fifty degrees centigrade sometimes facilitates the separation of the layers of oil and aqueous solution. The oil may be distilled either before or after the treatment if desired, although such distillation is not necessary for the removal of the pink color.

In my co-pending application Ser. No. 740,625 of which this is in part a division, a process for purifying tar-acid-bearing oils has been described in which weakly alkaline "buffer agents" (such as ammonium hydroxide, calcium hydroxide or sodium carbonate) are employed, as selective solvents for eliminating the poly-hydroxy-compounds. While the preferential solvent action of water depends for its effectiveness on the marked difference of water solubility between poly-hydroxy- (color-forming) and mono-hydroxy (non-color-forming) tar-acids, the selective solvent action of the weakly alkaline "buffer agents" used in the process described in my co-pending application, depends not on the greater water solubility of the poly-hydroxy-tar-acids but on their greater acidity as compared with the mono-hydroxy-tar-acids. The use of either water or buffer agent will be determined in any case by comparing the extra cost of the buffer agent required according to the method outlined in my co-pending application, with the greater expenditure for extraction tanks and the slightly greater loss of mono-hydroxy-tar-acids by the present process.

It is not intended to limit the scope of the present invention to the treatment of oils containing a definite percentage of color-forming and non-color-forming compounds, nor to the use of definite proportions of water, nor to the employment of particular temperatures. The process is applicable to mixtures of tar acids alone, and very satisfactory results are obtained by using widely varying proportions of water at normal atmospheric temperatures.

While the aqueous extraction of tar-acid-bearing oils of the class described is sometimes followed by washing with water in order to remove the last traces of poly-hydroxy-compounds, this water washing is not necessary except where residual oils of extreme purity are desired. The volumes of extraction water and wash water used are preferably limited to those required for dissolving the color-producing or ammonium salt impurities, and accordingly the loss of valuable mono-hydroxy-tar-acids from the residual tar oils is relatively small.

By employing the process forming the subject matter of the present invention for the purification of tar-acid-bearing oils, disinfectant emulsions can be prepared from soap base blends of the treated oil which will not turn pink, and the purification of the oils can be completed at a relatively small expense and without materially lowering the germicidal value of disinfectants prepared therefrom.

The term "tar-acid-bearing oils" is used in the description and claims to define coal tar oils generally, and also shale oil, low temperature coal tars, vertical retort tars and similar liquid condensates resulting from the distillation of bituminous material at low temperatures and under carbonizing conditions mild enough to preserve the liquid by-products in a substantially primary and unchanged form. The tar acid content of such oils is often characterized by the absence of more than traces of phenol, the presence of higher homologues of phenol, and is made up in part of compounds which, while they resemble phenols in some of their properties, do not apparently come within the generally accepted definition of a phenol but are rather hydroxyl derivatives of cyclic hydrocarbons which are non-aromatic in character, having hydrogen and alkyl side chains attached to the nucleus.

Having described my invention what I claim as new is:

1. In the treatment of tar-acid-bearing oil produced by the distillation of bituminous material and containing liquid products in a substantially primary and undecomposed form, which products are capable of producing color in the oil when the latter is employed in the manufacture of disinfectants and the like, to selectively eliminate such color producing compounds therefrom the step which comprises washing the oil with water at atmospheric pressure and approximately atmospheric temperature under conditions adapted to extract therefrom the said color-producing compounds while preventing material loss of valuable mono-hydroxy tar acids therefrom, and separating the aqueous extract from the residual oil.

2. In the treatment of tar-acid-bearing oil produced by the distillation of bituminous material and containing liquid products in a substantially primary and undecomposed form, which products are capable of producing color in the oil when the latter is employed in the manufacture of disinfectants and the like, to selectively eliminate such color producing compounds therefrom the step which comprises washing the oil with a small excess volume of water at approximately room temperature, settling, separating the aqueous layer from the residual oil while maintaining the same at temperatures within the range from approximately atmospheric temperature to about 50° C., and subjecting the residual oil to an additional washing with water.

3. The method of purifying tar-acid-bearing oil produced by the distillation of bituminous material and containing liquid products in a substantially primary and undecomposed form, which products are capable of producing color in the oil when the latter is employed in the manufacture of disinfectants and the like, which comprises agitating one volume of the oil with about five volumes of water for a period of about thirty minutes at room temperature, and separating the aqueous extract from the residual oil.

4. The method of purifying a tar oil produced by the distillation of solid bituminous material and containing liquid compounds capable of producing colored compounds in the presence of aqueous alkali solutions, which comprises agitating the said oil with at least an equal volume of water at approximately room temperature, stopping the agitation and warming the mixture to a temperature of not above 50° C., thereby facilitating the separation of the layers of oil and of aqueous solution respectively, and repeating at least once the treatment of the said oily layer with water.

5. The method of selectively eliminating color-producing compounds from a tar-acid-containing oil produced by the distillation of bituminous material and containing liquid products which are capable of producing color in oil, which method comprises washing with water at atmospheric pressure and at a temperature within the range from atmospheric to 50° C. a low temperature tar oil containing such products, whereby the color-producing compounds are extracted by the water while retaining a substantial amount of the tar acids present in the said oil, thereafter permitting the oil and aqueous layers to stratify, and separating and recovering the thus-purified oil.

In testimony whereof I affix my signature.

SOLOMON CAPLAN.